United States Patent [19]
Hori

[11] Patent Number: 5,401,931
[45] Date of Patent: Mar. 28, 1995

[54] WIRE-CUT ELECTROEROSION APPARATUS

[75] Inventor: Hidehito Hori, Kaga, Japan

[73] Assignee: Sodick Co., Ltd., Yokohama, Japan

[21] Appl. No.: 104,904

[22] Filed: Aug. 12, 1993

[30] Foreign Application Priority Data

Aug. 13, 1992 [JP] Japan .................. 4-216094

[51] Int. Cl.⁶ .............................................. B23H 7/02
[52] U.S. Cl. ................... 219/69.12; 219/69.11
[58] Field of Search ............... 219/69.11, 69.12, 69.14

[56] References Cited

U.S. PATENT DOCUMENTS

| | | | |
|---|---|---|---|
| 4,565,915 | 1/1986 | Girardin | 219/69.12 |
| 4,712,288 | 12/1987 | Lodetti et al. | 29/557 |
| 4,751,361 | 6/1988 | Inoue et al. | 219/69.12 |
| 4,755,651 | 7/1988 | Tsutsui et al. | 219/69.14 |
| 5,028,757 | 7/1991 | Aramaki et al. | 219/69.12 |
| 5,264,676 | 11/1993 | Kanaya et al. | 219/69.11 |

FOREIGN PATENT DOCUMENTS

| | | | |
|---|---|---|---|
| 347716 | 12/1989 | European Pat. Off. | 219/69.14 |
| 0410493 | 1/1991 | European Pat. Off. | |
| 3824006 | 1/1990 | Germany | 219/69.11 |
| 61-270023 | 11/1986 | Japan | |
| 2-48113 | 2/1990 | Japan | 219/69.11 |
| 2-298435 | 12/1990 | Japan | |
| 4-57622 | 2/1992 | Japan | 219/69.11 |
| 4-115818 | 4/1992 | Japan | 219/69.14 |
| 5-23918 | 2/1993 | Japan | 219/69.14 |

*Primary Examiner*—Geoffrey S. Evans
*Attorney, Agent, or Firm*—Marks & Murase

[57] ABSTRACT

A wire-cut electroerosion apparatus comprising a work tank (6) for containing a dielectric fluid, the tank having at least one wall with an opening (36) therein, and a lower arm (15) which is supported at one end on the outside of the work tank and extending through the opening into the tank, the tank being movable relative to the lower arm. The work tank includes a base container member (12) and at least one movable frame member (13,14). The base container member includes a rear wall with the above-noted opening therein and a low wall formed along the other three sides, the low wall being lower than the bottom of the workpiece. The movable frame member(s) can be raised and lowered using a pantograph (20) to thereby easily access the workpiece and electrode wire.

15 Claims, 6 Drawing Sheets

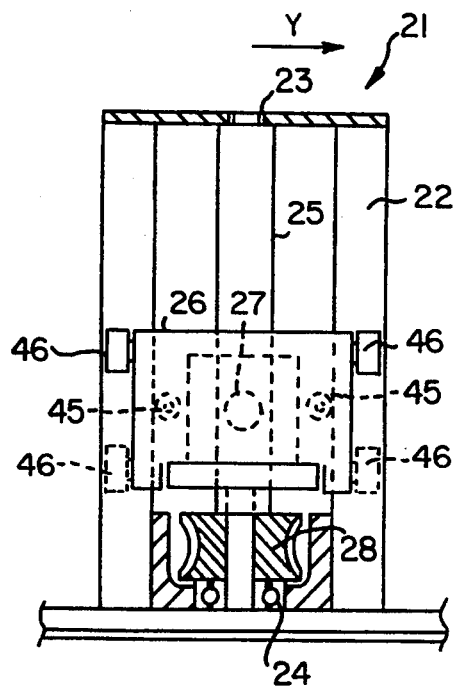
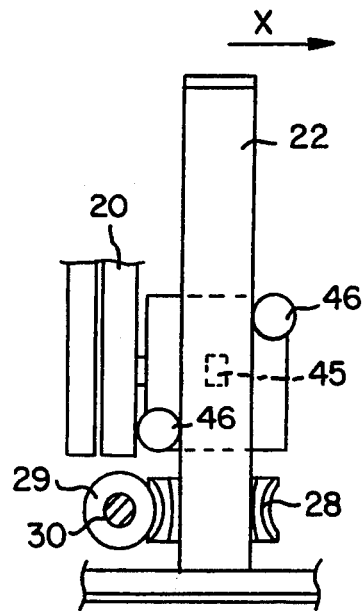
FIG. 6    FIG. 7
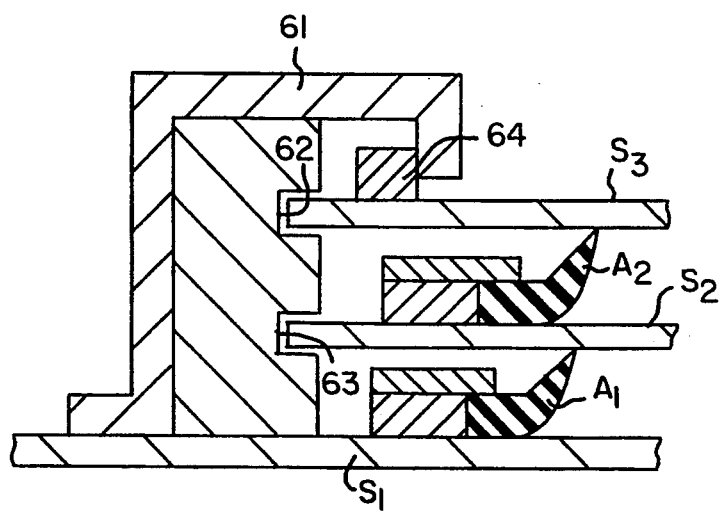
FIG. 8

WIRE-CUT ELECTROEROSION APPARATUS

FIELD OF THE INVENTION

The present invention relates generally to a wire-cut electroerosion apparatus. More specifically, the present invention relates to a wire-cut electrical discharge machining ("EDM") apparatus for machining a workplace submerged in a work tank filled with a dielectric fluid.

BACKGROUND OF THE INVENTION

In general, there are two different types of EDM apparatus for machining a workplace in a work tank using electrical discharges; i.e., die sinking EDM apparatus and wire-cut EDM apparatus.

In a die sinking EDM apparatus, a cavity of a desired configuration is formed in the workplace. A dielectric fluid is introduced into the work tank in order to submerge the workplace which is fixed on a work table in the work tank. During machining operations, a tool electrode having a three-dimensional shape advances toward the workplace, usually from above along the Z axis. A door is typically provided on the front wall of the work tank to provide access to the workplace and the tool electrode. However, the work tank walls still impair accessibility to the workplace and electrode. Further, considerable front clearance space is required to open and close the door which swings out horizontally. In addition, in cases where an automatic pallet changer is used to carry out unmanned machine operations over a period of several days, the tank walls become an obstacle to changing the workplace.

U.S. Pat. No. 4,712,288 to Lodetti, et al. and Japanese Laid-Open Patent Publication No. 61-270023 disclose a die sinking EDM apparatus having the work tank in which a rear wall is fixed and the other three walls are of a U-shaped, unitary construction which can be lowered to provide access to the work table.

Also, Japanese Laid-Open Patent Publication No. 2-48113 discloses a die sinking EDM apparatus having a work tank consisting of a base container member and at least one movable frame member which can move vertically. The movable frame member moves down into the base container member so that the four walls of the work tank can telescope as a whole in a sealing relationship.

In a wire-out EDM apparatus, the workpiece is usually fixed on a work stand or work stands in the work tank which is movable in a horizontal plane. A lower arm extends into the work tank through an opening in one of the walls thereof and an upper arm is positioned above the lower arm. An electrode wire travels between an upper wire guide block and a lower wire guide block which are mounted on the ends of the upper arm and the lower arm, respectively. The electrical discharges occur between the traveling wire and the workpiece through the dielectric fluid while the relative movement between the position of the wire electrode and work tank (and hence the workpiece) in the X and Y axes is controlled since in a wire-cut EDM apparatus, water or a water solution may be used as a dielectric fluid, so-called "submerged machining" in which the workpiece is submerged in the work tank during machining is generally desirable, for example, to prevent rust.

As in a die sinking EDM, the tank walls of a wire-cut EDM apparatus impair access by the user when loading the workpiece onto the work stand and when vertically aligning the electrode wire in preparations for machining. Japanese Laid-Open Patent Publication No. 2-298435 discloses a wire-cut EDM apparatus in which three tank walls, comprising the front and both side walls, include a bellows which moves up and down as it is expanded and contracted. However, because of the bellows' construction this apparatus is not designed for submerged machining. If the work tank is filled with a dielectric fluid, the walls of the bellows will expand, as such walls are of a relatively flimsy construction.

SUMMARY OF THE INVENTION

An object of the present invention is to provide a wire-cut electroerosion apparatus which permits easy access to the workpiece and the electrode wire.

It is another object of the invention to provide a wire-cut electroerosion apparatus having improved machining efficiency.

It is further an object of the invention to provide a wire-cut electroerosion apparatus in which walls of a multi-walled work tank can be moved vertically with a high precision while maintaining a fluid-tight relationship therebetween.

It is yet a further object of the invention to provide a wire-cut electroerosion apparatus in which walls of a work tank can be moved vertically without the need to provide additional space and mechanisms for housing the lowered walls.

It is further an object of the invention to provide a wire-cut electroerosion apparatus in which walls of a work tank can be moved vertically as required, notwithstanding the relative position of the work tank.

Additional objects and advantages and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

A general aspect of the present invention is the provision of a wire-cut electroerosion apparatus having an electrode wire for machining a workpiece. The apparatus comprises a work tank for containing a dielectric fluid and having at least one wall with an opening therein, and a lower arm which is supported at one end outside of the work tank, and which extends through the opening in the tank, the tank being movable relative to the lower arm with a fluid-sealing relationship therebetween. The work tank consists of a base container member including a rear wall formed at the rear side with the opening therein and a low wall formed at the other three sides of the work tank, the low wall preferably not extending above the base of the workpiece so as to create an open, easily accessed space, and at least one movable frame member which is vertically slidable for covering the open space. The apparatus further comprises a device for raising and lowering the movable frame member.

In accordance with a preferred embodiment of the present invention, the raising and lowering device comprises a pantograph having slide pins slidably fitted to pin guides attached to side walls of the base container member and the movable frame member for raising and lowering the movable frame member. The raising and lowering device may further comprise a pantograph driving means connected to the pantograph through a link pin for vertically expanding and contracting the pantograph and an actuating device for actuating the pantograph driving means.

Preferably, the pantograph driving means comprises a frame, a ball screw vertically supported by the frame and rotatable therein, and a housing member which spirally engages the ball screw and which engages the link pin, so that the housing member will move vertically as the actuating device drives the ball screw.

Preferably, the housing member is guided by the frame by means of a plurality of guide rollers to thereby maintain the pantograph upright against any bias load applied thereto.

The base container member advantageously includes a guide rail for guiding the movable frame member.

Further, the movable frame member may include a locking flange for locking the movable frame member to the base container member through the guide rail against the fluid pressure in the tank.

BRIEF DESCRIPTION OF THE DRAWINGS

The present invention will be more apparent from the following detailed description, when taken in conjunction with the accompanying drawings, in which;

FIG. 6 is an cross-sectional front view of pantograph driving means according to an embodiment of the present invention; and FIG. 7 is an cross-sectional side view of pantograph driving means according to an embodiment of the present invention.

FIG. 8 is an cross-sectional view showing a locking member according to another embodiment of the present invention.

DETAILED DESCRIPTION OF THE PREFERRED EMBODIMENTS

Various embodiments of the present invention are described hereinafter with reference to the drawings. As explained above, a major aspect of the present invention is the provision of a work tank and structure for manipulating a work tank in a wire-cut electroerosion apparatus. However, for ease of understanding, the wire-cut electroerosion apparatus embodying the present invention will be described first.

Figure 2:
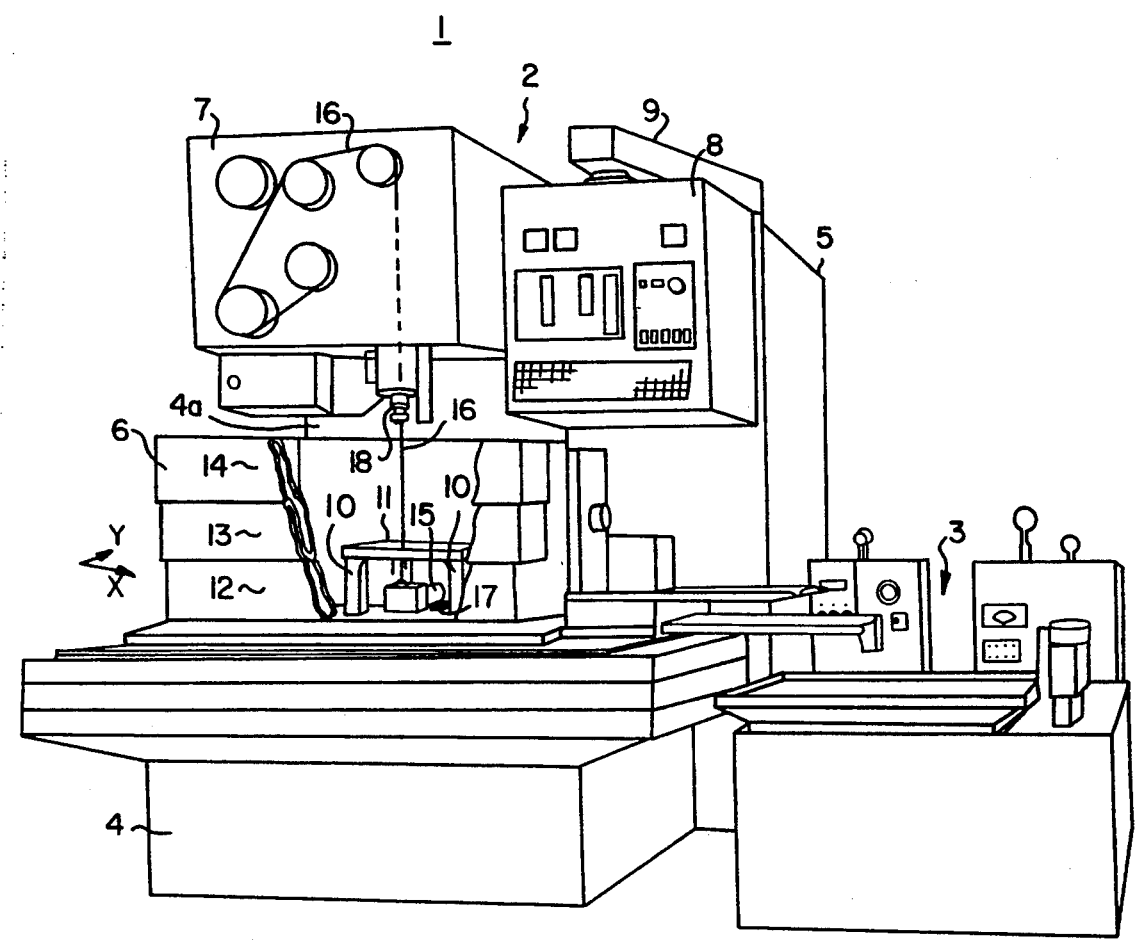
FIG. 2 is a perspective view, in partial cutaway, illustrating a wire-cut electroerosion apparatus equipped with an embodiment of the present invention.

FIG. 2 illustrates a wire-cut electroerosion apparatus according to an embodiment of the present invention. The wire-cut electroerosion apparatus 1 consists of a machine body 2, a dielectric fluid supply device 3 and a power generator 5. The machine body 2 includes a bed 4 positioned in front of a column 4a. A cross table (not illustrated) is provided on the bed 4. A work tank is preferably overlaid on the cross table, and is moveable in a horizontal plane comprising orthogonal X and Y axes. In the illustrated embodiment, a wire feeding device 7 is secured on an upper part of the column 4a and projects forwardly thereof, and an operation panel 8 is suspended forwardly by a pivotal pendant arm 9 from the crest of the power generator 5. A plurality of work stands 10 may be provided in the work tank 6. A workpiece 11 to be machined is fixed on an upper surface of the work stand(s) 10.

The work tank 6 includes a base container member 12, a first movable frame member 13 and a second movable frame member 14. The base container member 12 includes a rear wall having an opening therein through which a lower arm 15 passes. The base container member 12 also includes a low wall on three other sides which is lower than the rear wall and is preferably lower than a top surface of the work stand(s) 10, Thus, the base container member 12 is open toward its front and sides. The first and second movable frame members 13 and 14 are slidable to close the front and side open space formed in the base container member 12.

The lower arm 15 is fixedly supported at one end by the column 4a and includes a lower wire guide block 17 for guiding an electrode wire 16 mounted on the other end inside the work tank 6. An upper wire guide block 18 for guiding the electrode wire 16 is mounted on an upper arm (unnumbered) below the wire feeding device 7.

When preparing to machine, the workpiece 11 is fixed on the work stand(s) 10 in the work tank 6 and the movable frame members 13 and 14 are raised to close the open space in the base container member 12. Then, the work tank 6 is filled with dielectric fluid to submerge the workpiece 11 therein, and the electrode wire 16 is tensioned between the upper and lower wire guide blocks 18 and 17 through, for example, an initial hole pre-formed in the workplace 11.

Next, an electrode wire 16 is continuously fed from the wire feeding device 7 and electrical discharges are created in the machining gap formed between the traveling electrode wire and the workplace 11 through the dielectric fluid. The workplace 11 is machined by the electric discharges and thereby shaped into a desired configuration by moving the cross table in the X- and/or Y- axis directions along the machining path.

The dielectric fluid supply device 3 includes a storage tank and serves to maintain the resistivity of the fluid and to remove, i.e., filter, machined chips from the machining gap which become entrained in the fluid.

The construction of the work tank 6 and raising device for raising the movable frame members 13 and 14 will now be described.

Figure 1:
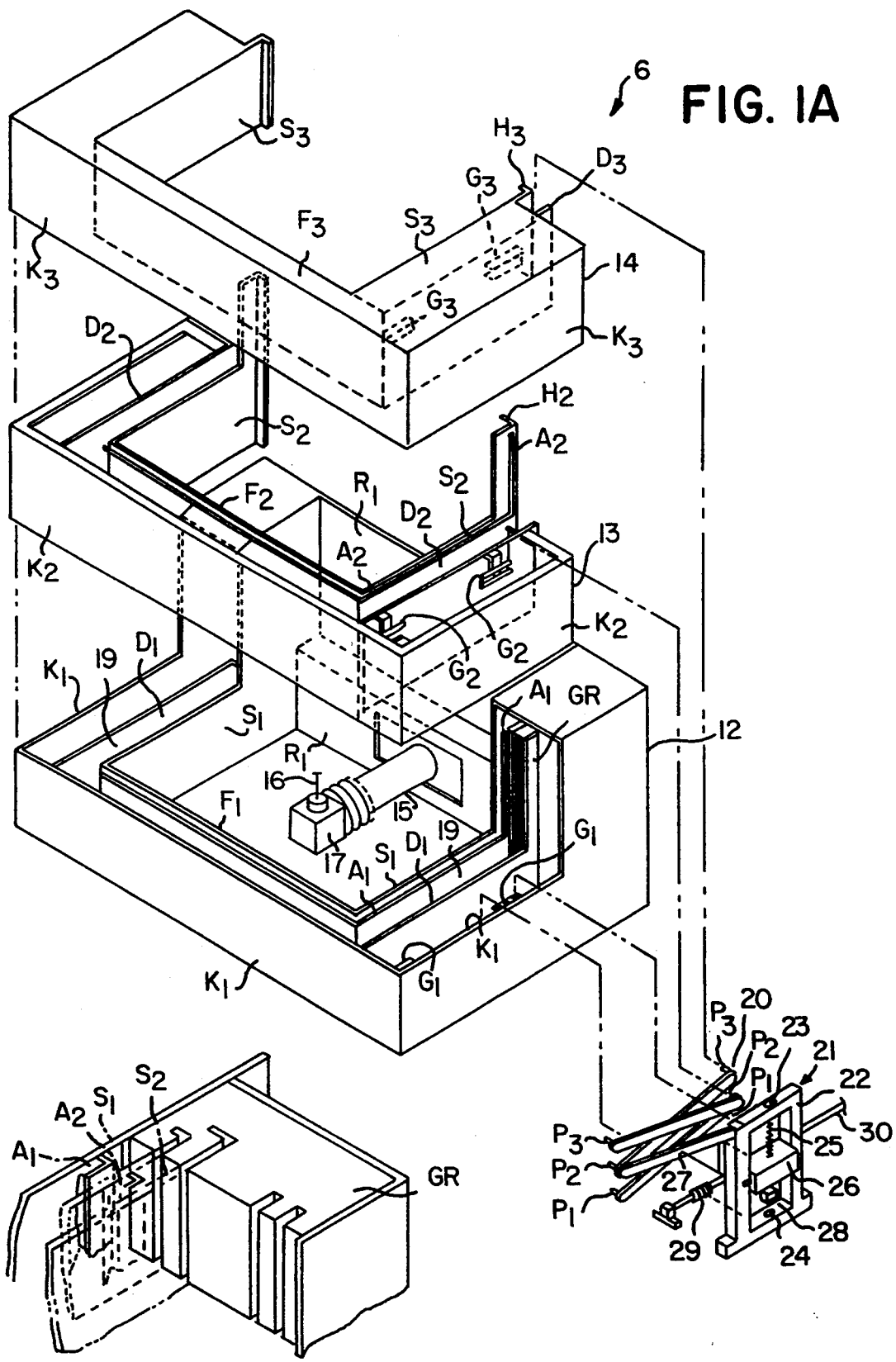
FIGS. 1(a) and (b) are perspective views showing the work tank and the raising device according to an embodiment of the present invention.

FIG. 1 (a) is an exploded perspective view of a part of the work tank 6 and the raising device. FIG. 1 (b) is an enlarged portion of FIG. 1(a) showing details of a guide rail section.

The base container member 12 includes a relatively tall rear wall R1, a front wall F1, and two side walls S1. The front wall F1 and most of the side walls S1 are preferably lower than the top surface of the work stand(s) 10 whereby the base container member is open towards its front and sides. A partition wall D1 is provided outside of the front wall F1 and the side walls S1 to form a U-shaped drainage gutter 19. Further, covers K1 are provided outside of the partition wall D1. The covers K1 and the partition wall D1 are spaced from each other.

Figure 4:
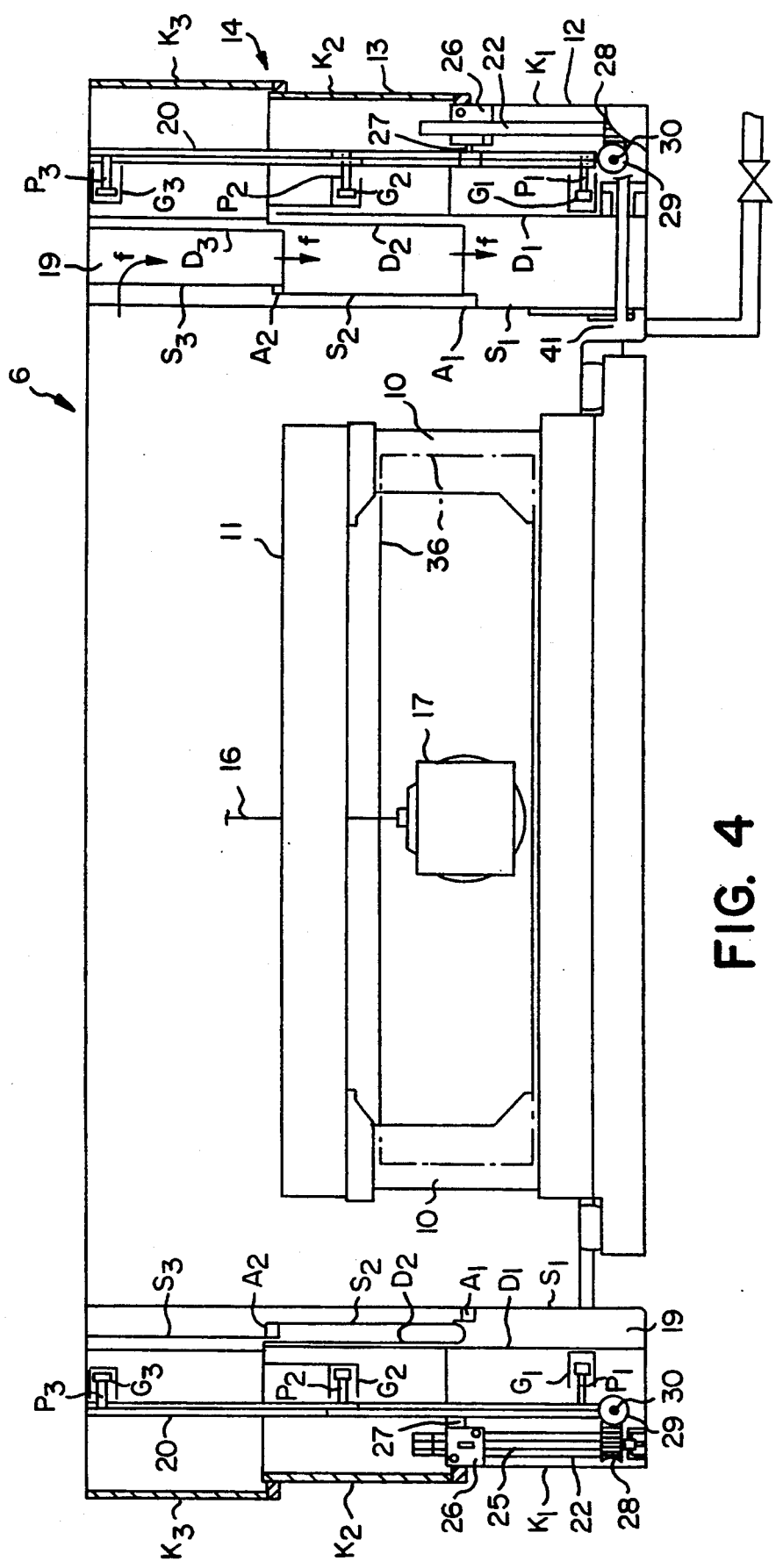
FIG. 4 is a cross-sectional front view of a work tank for a wire-cut electroerosion apparatus according to an embodiment of the present invention.
Figure 5:
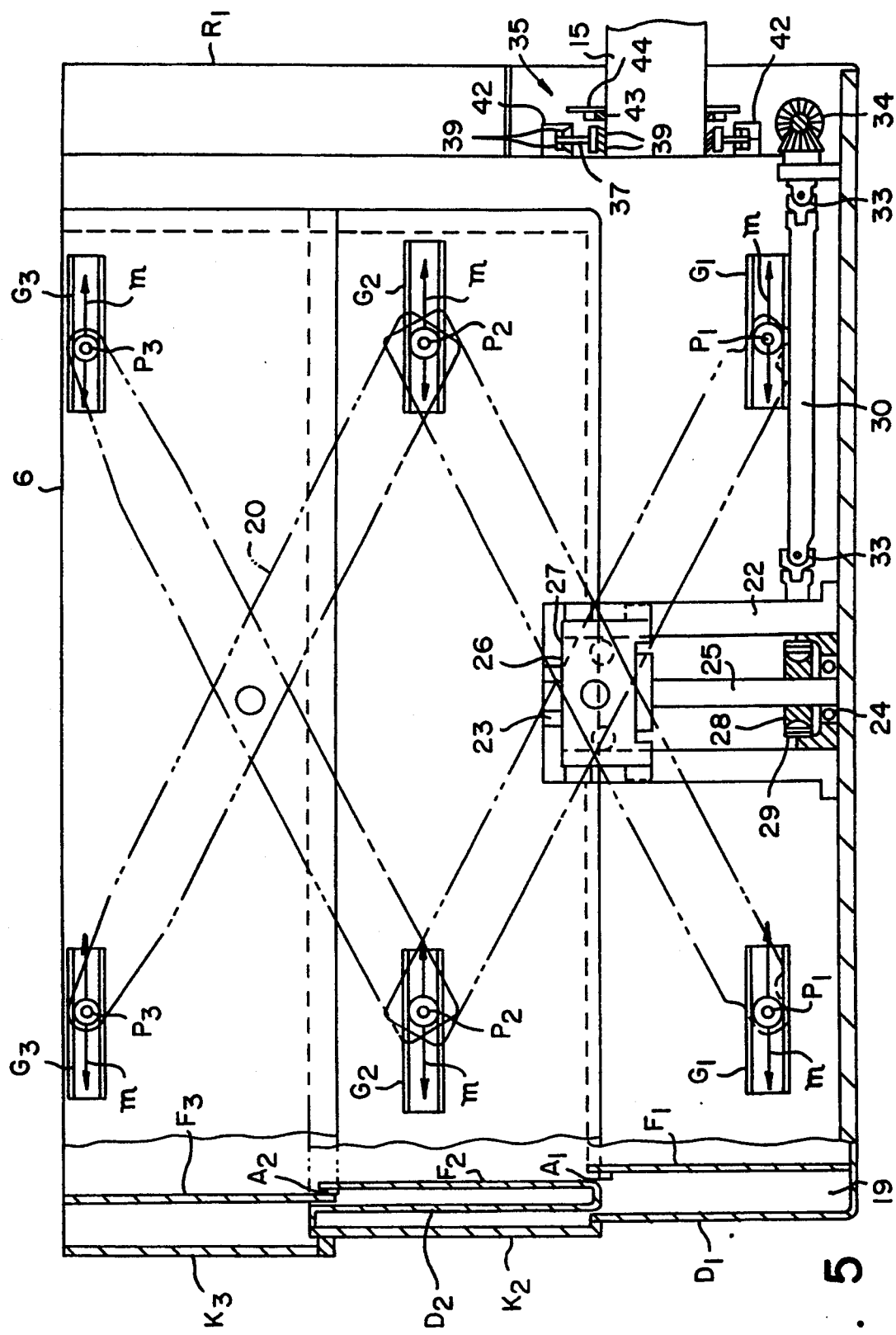
FIG. 5 is a cross-sectional side view of a work tank for a wire-cut electroerosion apparatus according to an embodiment of the present invention.

The first movable, U-shaped frame member 13 partly covers the open space formed in the base container member 12. This first movable frame member 13 comprises an inner wall consisting of a front wall F2, two side walls S2, and locking flanges H2. The first movable frame member 13 may further comprise a partition wall D2 enclosing the inner wall and in spaced relation thereto, and a cover K2 enclosing the partition wall D2 and in spaced relation thereto. As best shown in FIGS. 4 and 5, the inner walls F2 and S2 and the partition wall D2 are partially interconnected at their bases to form a narrow U-shaped groove. This U-shaped groove is positioned and dimensioned to telescope in between the inner walls F1 and S1 and the partition wall D1 to form a part of the U-grooved drainage gutter 19 of the base container member 12. In addition, the cover K2 extends outside of the cover K1 of the base container member 12.

The second movable frame member 14 has a similar construction to the first movable frame member 13 in that it is formed in a U-shape to cover the remaining open space formed by the base container member 12. The second movable frame member 14 comprises an inner wall consisting of a front wall F3, two side walls S3, and locking flanges H3. A partition wall D3 is provided on the outside of one of walls S3. A cover K3 is provided on the outside of the front wall F3, the side walls S3 and the partition wall D3 in spaced relation thereto. one of walls S3 and the partition wall D3 are interconnected at their bases to form a narrow U-shaped groove. This U-shaped groove is positioned and dimensioned to telescope in between the side wall S2 and the partition wall D2 to form an upper part of the U-shaped drainage gutter 19. The cover K3 covers over the upper part and extends outside of the cover K2 of the first movable frame member 13 when it is lowered.

The base container member 12, the first movable frame member 13 and the second movable frame member 14 form the work tank 6 in which all sides are enclosed by tall walls when the movable frame members 13 and 14 are in their raised position. The base container member 12, the first frame member 13 and the second movable frame member 14 may telescopically overlay each other by lowering the movable frame member 13 and 14 to thereby form a work tank in which three walls (front and sides) are lowered.

A seal member A1 is attached to the outside surface of the inner walls S1 and F1 of the base container member 12 and a seal member A2 is attached to the outside surface of the inner walls S2 and F2 of the first movable frame member 13. These seal members A1 and A2 are provided to prevent leakage of dielectric fluid from the work tank when the movable frame members 13 and 14 slide up and down. A guide rail GR (FIG. 1(b)) runs along the drainage gutter 19 (which is formed to have an almost U-shaped horizontal cross section) and further extends vertically along both ends of the drainage gutter 19 to guide the ends of walls S2 and S3 and to maintain the sealing performance of the seal members A1 and A2. In addition, the guide rail GR guides the locking flanges H2 and M3 provided on the ends of the side walls S2 and S3, respectively. The flange members H2 and H3 prevent the movable frame members 13 and 14 from moving forward as a result of the hydrostatic pressure of the fluid in the tank so that the fluid will not leak from the clearances between the front walls.

In the event of leakage, the fluid will be channeled to and will accumulate in the gutter 19 from where it may be discharged through an outlet (not illustrated) disposed in the gutter 19.

As best seen in FIGS. 4 and 5, pin guides G1, G2 and G3 are provided on the outside surface of the partition walls D1, D2 and D3, respectively. Slide pins P1, P2 and P3, secured to a pantograph 20 are slidably fitted to the pin guides G1, G2 and G3, respectively. In the illustrated embodiment, a pantograph 20 is attached to each side of the work tank 6 by means of slide pins P1, P2 and P3.

A pantograph driving means 21 (see FIG. 6) is provided adjacent each of the pantographs 20. The pantograph driving means 21 includes a frame 22 supported on the base of the base container member 12, a ball screw 25 supported by the frame 22 through bearings 23 and 24 and a housing member 26 which spirally engages the ball screw 25. The housing member 26 is connected to a cross portion of the pantograph 20 through a link pin 27. The housing member 26 houses a ball screw nut which moves vertically as the ball screw 25 rotates.

In this embodiment, a worm wheel 28 is fittingly secured to a lower part of the ball screw 25. A drive shaft 30 (FIG. 7) is provided in the vicinity of the frame 22. A worm 29, which engages the worm wheel 28, is fixed on the drive shaft 30. The ball screw 25 is rotatively driven by turning the driving shaft 30 through the worm wheel 28 and worm 29.

Figure 3:
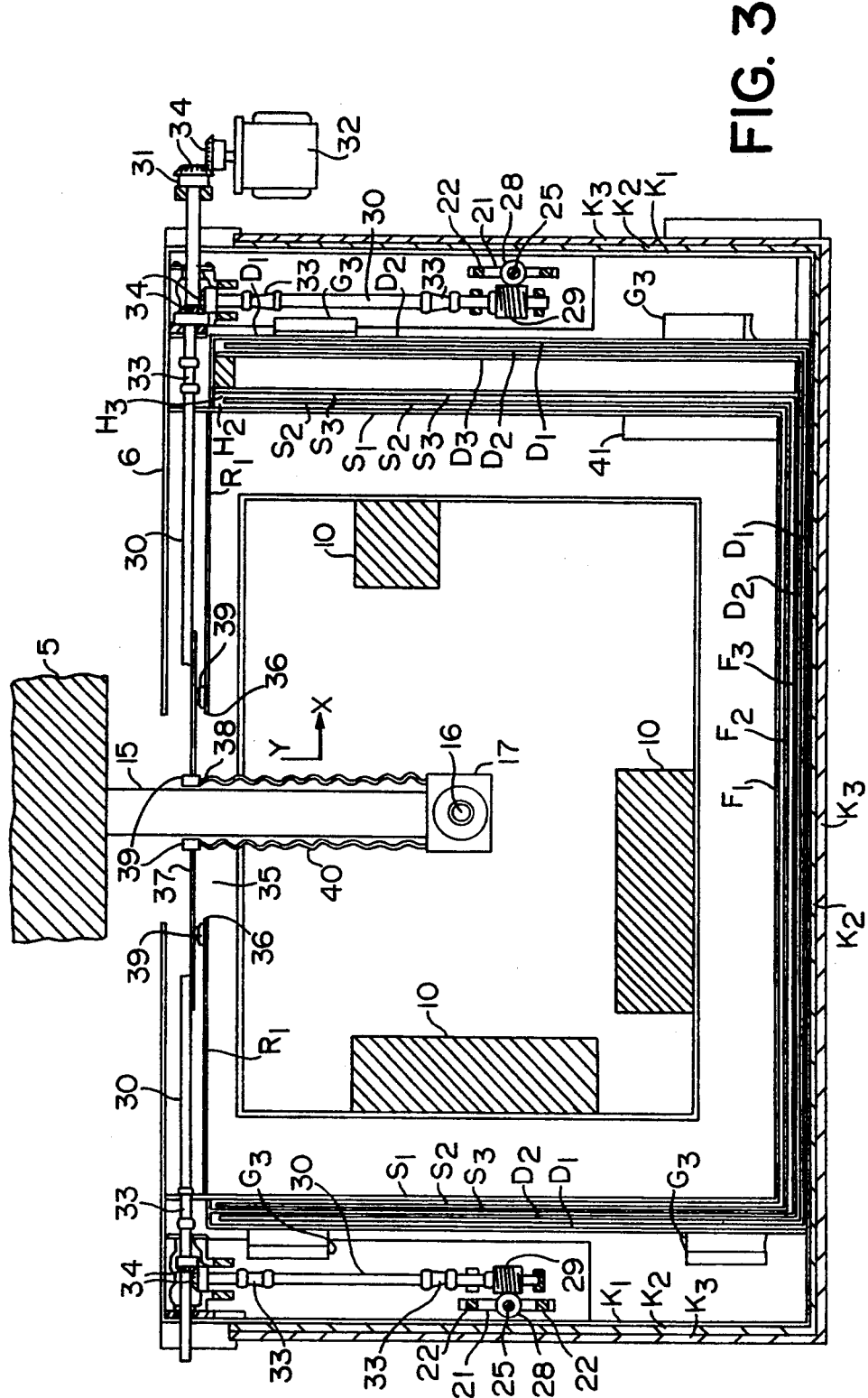
FIG. 3 is a horizontal sectional view of a work tank for a wire-cut electroerosion apparatus according to an embodiment of the present invention.

FIG. 3 shows a horizontal cross section of the work tank 6 and a power transmission mechanism for actuating the pantograph driving means 21. As shown in FIG. 3, a pantograph driving means 21 is disposed on each side of the work tank 6. A drive motor 32 is provided in the vicinity of the work tank 6 to serve as a driving power source for a device 31 for raising and lowering the movable frame members 13 and 14. Multiple drive shafts 30 may be linked to the drive motor 32 through universal joints 33 and bevel gears 34 to operably transmit power from the rear of the work tank 6 to the driving means 21 positioned on either side of the work tank 6, whereby ball screws 25 of each of the pantograph driving means 21 may be rotatively driven by means of the drive shafts 30 of worms 29 and worm wheels 28.

In addition, the construction of an arm passage portion 35 for the lower arm 15 is best shown in FIG. 3. A long horizontal opening 36 is formed in the rear wall R1 of the base container member 12. A slide plate 37 covers the opening 36 from the outside and is slidable in the X-axis direction with respect to the work tank 6. The slide plate 37 has a through hole 38 at or about its center for the passage of the lower arm 15. Seal members 39 are provided between the opening 36 and the slide plate 37 and between the slide plate 37 and the lower arm 15. Due to this construction, the work tank 6 and the lower arm 15 can move relative to each other in the X- and y-axis directions while maintaining the sealing of the work tank.

Additionally, a drainage hole 41 may be provided in the work tank 6 for draining dielectric fluid.

As best shown in FIG. 4, the base container member 12 and the movable frame members 13 and 14 are preferably positioned and dimensioned to telescopically overlay each other. The drainage gutter 19 formed between side walls S1, S2 and S3 and the partition walls D1, D2 and D3 collect any overflow fluid which exceeds a predetermined fluid level as shown by the top arrow f.

The pantograph 20 and the pantograph driving means 21 are provided on the inside of the covers K1, K2 and K3.

The pin guides G1, G2 and G3 are preferably attached to the outside surfaces of the side partition walls D1, D2 and D3 and slidably engage with the respective slide pins P1, P2 and P3 secured to the pantographs 20.

Each of the pantographs 20 is connected to the housing member 26 of the pantograph driving means 21 through the link pin 27 on the opposite side of the slide pins P1, P2 and P3.

FIG. 5 is a cross-sectional side view of the work tank 6.

As best shown in FIG. 5, the pin guides G1, G2 and G3 are positioned at both the front and back portions of the side walls of the base container member 12 and the movable frame members 13 and 14, respectively. The slide pins P1, P2 and P3 are secured to the ends and to the joint portions of the pantographs 20 and can move horizontally within their respective pin guides G1, G2 and G3, as shown by the arrow m.

The link pin 27 is rollably secured to the housing member 26 and engages a cross portion of the pantograph 20.

As the housing member 26 moves vertically through the rotation of the ball screw 25, the pantograph 20 expands and contracts in the vertical direction, causing the movable frame members 13 and 14 to slide up and down while being horizontally supported by the pin guides G1, G2 and G3 and the slide pins P1, P2 and P3.

As shown in FIG. 5, the slide plate 37 through which the lower arm 18 passes, is guided by plate holding members 42. A dam 43 and a dam supporter 44 may be provided on the outside of the slide plate 37 to shield against entry into the tank of unwanted substances.

Next, the construction of the pantograph driving means 21 will be described with reference to FIGS. 6 and 7.

The pantograph driving means 21 includes the frame 22 which is fixed to the work tank 6. The ball screw 25 is rotatably supported in an upright orientation by the frame 22 by means of bearings 23 and 24. A worm wheel 28 is secured to a lower part of the ball screw 25. The housing member 26 houses a ball screw nut which spirally engages the ball screw 15 and which is positioned above the worm wheel 28. The housing member 26 includes Y-direction guide rollers 45 and X-direction guide rollers 46 for maintaining the pantograph 20 upright against any bias load from the dead weight on it (since the movable frame members 13 and 14 are U-shaped and therefore front heavy).

The Y-direction guide rollers 45 consist of a pair of rollers which rollingly contact the inner surfaces of frame 22. The rollers 45 are preferably positioned at the same level as the link pin 27 to maintain the pantograph 20 upright, i.e., against a movement in the Y-direction.

As best seen in FIG. 7, the X-direction guide rollers 46 consist of two pairs of rollers, each pair positioned at a different level on the housing 26. In the illustrated embodiment, the lower pair of rollers rollingly contact the surface of the frame 22 facing to the pantograph 20. The other (upper) pair of rollers are positioned on the opposite side of the frame 22 from the lower pair of rollers and rollingly contact the surface of the frame 22 facing towards the cover K1. As alluded to above, the levels of these two pairs of rollers is preferably vertically offset.

The center of the housing member 26, which is connected to the link pin 27, experiences force moments imposed through the link pin 27 by the tank weight load via the pin guides G2 and G3. The X-direction guide rollers 46 resist these moments to thereby maintain the pantograph upright against movement in its X-direction. In addition, the housing member 26 is stably guided by the frame 22 by means of the guide rollers 45 and 46 so that no excessive radial load will be imposed between the ball screw 25 and the ball screw nut.

Based on the construction of the above-described embodiment, the operation of a wire-cut electroerosion apparatus 1 of this embodiment will now be described.

As described above, front wall F1 and most of the side walls S1 of the base container member 12 of the work tank 6 are preferably lower than the top surface of the work stands 10 whereon a workplace 11 may be fixed to thereby present a work tank which is open towards the front and sides. The base container 12 also includes a tall rear wall R1, having an opening 36 for the passage of the lower arm 15, whereby the tank can move relative to the lower arm 15. The first and second movable frame members 13 and 14 are formed in a U-shape. The movable frame members 13 and 14 are sized and positioned to slide up in order to cover the open space in the base container member 12 and to slide down to telescopically overlay upon the low walls F1 and S1 of the base container member 12.

Thus, when they are lowered, the movable frame members 13 and 14 will not interfere with the lower arm 15. As soon as the dielectric fluid is drained after a machining operation, the movable frame members 13 and 14 may be lowered, thereby lowering the front and side walls of the work tank 6 below the workpiece 11. Therefore, access to the workpiece from the front and sides is easily provided. After an operator changes the workpiece 11 and fixes it on the work stand(s) 10, the work tank can be refilled with dielectric fluid while the movable frame members 13 and 14 are raised into position and machining can be immediately restarted and machining efficiency thereby improved.

As will be apparent from this embodiment, multiple sets of the pantograph 20 and pantograph driving means 21 may be provided and these sets may be synchronized by means of a single drive motor 32. Also, the multiple movable frame members 13 and 14 can be supported at a plurality of fulcra and can simultaneously move vertically while being supported in a desired horizontal position.

Moreover, in this embodiment, the housing member 26 of the pantograph driving means 21 is guided by the frame 22 through the Y-direction guide rollers 45 and the X-direction guide rollers 46.

As will be appreciated by the artisan, the locking flanges and the guide rail for guiding the locking flanges are not limited to the embodiment shown in FIG. 1. As shown in FIG. 8, a locking member 61 having an angled flange portion at its end may be fixedly secured on side wall S1 of the base container member 12. In this embodiment, a guiding member having guiding grooves 62 and 63 is fitted inside the locking member 61. The side walls S2 and S3 of the movable frame members 13 and 14 are guided by the guiding grooves 63 and 62, respectively. A stop 64 is fixed on the outer surface of the side wall S3 so as to engage with the angled flange portion of the locking member 61. Seal members A1 and A2 are provided for the side walls S1, S2 and S3. In this arrangement, the movable frame members 13 and 14 are prevented from moving forward due to fluid pressure by the locking member 61 and stop 64.

The foregoing description of preferred embodiments of the invention have been presented for purposes of illustration and description. It is not intended to be exhaustive or to limit the invention to the precise form disclosed, and obviously many modifications and variations are possible in the light of the above teaching. For example, the workpiece may be replaced automatically or semi-automatically by use of a conventional NC controller, dielectric fluid supply control and a lifting device. After machining, the movable frame members may be automatically lowered at the same time the dielectric fluid is being drained. The workpiece may be replaced manually or by an automatic pallet changer. After detecting the end of the workpiece change, for example, by use of a sensor, dielectric fluid may be re-supplied to the work tank at the same time the moveable frame members are automatically lifted into place. Then, machining may be immediately restarted. It is intended that the scope of the invention be defined by the claims appended hereto.

We claim:

1. A wire-cut electroerosion apparatus having an electrode wire, tensioned between upper and lower guide members for machining a workpiece supported at a vertical location in a working zone thereof, said apparatus comprising:

a stable, generally four-sided work tank for containing a dielectric fluid, said work tank including a base container member forming at least a rear wall at the rear side thereof and having an opening therein, and a low wall forming at least a part of a front and a part of at least one side thereof, said low wall being sufficiently low in height to create an open space to thereby provide access to said workpiece from the front and said at least one side thereof when said workpiece is supported in said vertical location in the working zone of said apparatus;

an arm supported at one end thereof outside of said work tank and extending through said opening in a sealing relationship therewith, said lower guide being disposed on the other end of said arm, said tank and said arm being movable relative to each other;

said work tank further comprising at least one movable frame member vertically moveable and stowable with respect to said base container member whereby said at least one moveable frame member is operable to be raised from a stowed position to thereby cover said open space; and means for raising and lowering said at least one movable frame member with respect to said base container member; and wherein said base container member and each moveable frame member of said at least one moveable frame member further includes pin guides secured thereto and wherein said means for raising and lowering the moveable frame member comprises a pantograph having slide pins receivable in said pin guides, a pantograph driving means for expanding and contracting said pantograph, and an actuating device for actuating said pantograph driving means.

2. The wire-cut electroerosion device according to claim 1, wherein said container member forms a rear wall of said work tank and said low wall forms a part of the front and sides thereof and further comprising a pair of pantographs, and wherein said base container member and said at least one moveable frame member include a set of said pin guides secured at each of the side walls thereof to thereby engage slide pins associated with each of said pantographs, and wherein both of said pantographs are synchronously driven by said actuating device via respective pantograph drive means.

3. The wire-cut electroerosion apparatus according to claim 1, wherein said pantograph further comprises a link pin about which said pantograph expands and contracts and wherein said pantograph driving means comprises a frame, a screw adapted to be rotatably driven by said actuating device and supported by said frame, and a housing member (26) connected to said pantograph by means of said link pin and positioned to spirally engage said screw; and whereby said housing member is raised and lowered by means of rotation of said screw.

4. The wire-cut electroerosion apparatus according to claim 3, further comprising a plurality of rollers for guiding movement of said housing member within said frame, whereby the pantograph is supported against a load applied thereto.

5. The wire-cut electroerosion device according to claim 2, wherein said at least one moveable member comprises first and second moveable frame members, said first moveable member in its raised position being positioned adjacent said base container member and said second moveable member, in its raised position, being positioned adjacent said first moveable member, said first and second moveable members, in their lowered positions, being adapted to telescopically nest with said base container member whereby said open space is unobstructed thereby.

6. The wire-cut electroerosion apparatus according to claim 3, wherein said screw is vertically disposed with respect to said work tank.

7. A wire-cut electroerosion apparatus having an electrode wire, tensioned between upper and lower guide members for machining a workpiece supported at a vertical location in a working zone thereof, said apparatus comprising:

a stable, generally four-sided work tank for containing a dielectric fluid, said work tank including a base container member forming at least a rear wall at the rear side thereof and having an opening therein, and a low wall forming at least a part of a front and a part of at least one side thereof, said low wall being sufficiently low in height to create an open space to thereby provide access to said workpiece from the front and said at least one side thereof when said workpiece is supported in said vertical location in the working zone of said apparatus;

an arm supported at one end thereof outside of said work tank and extending through said opening in a sealing relationship therewith, said lower guide being disposed on the other end of said arm, said tank and said arm being movable relative to each other;

said work tank further comprising at least one movable frame member vertically moveable and stowable with respect to said base container member whereby said at least one moveable frame member is operable to be raised from a stowed position to thereby cover said open space; and means for raising and lowering said at least one moveable frame member with respect to said base container member; and wherein said base container member includes a guide rail for vertically guiding said at least one movable frame member and wherein said movable frame member includes a locking part for locking said movable frame member to said base container member through said guide rail by means of a fluid pressure in said work tank.

8. The wire-cut electroerosion device according to claim 7, wherein said at least one moveable frame member comprises first and second moveable members, said first moveable member in its raised position being positioned adjacent said base container member and said second moveable member, in its raised position, being positioned adjacent said first moveable member, said first and second moveable members, in their lowered positions, being adapted to telescopically nest with said base container member whereby said open space is unobstructed thereby.

9. The wire-cut electroerosion apparatus according to claim 7, wherein said locking part includes stop means for preventing movement of said at least one moveable member away from said rear wall under the influence of hydrostatic pressure caused by fluid contained in said work tank.

10. A wire-cut electroerosion apparatus having an electrode wire, tensioned between upper and lower guide members for machining a workpiece supported at a vertical location in a working zone thereof, said apparatus comprising:
- a stable, generally four-sided work tank for containing a dielectric fluid, said work tank including a base container member forming at least a rear wall at the rear side thereof and having an opening therein, and a low wall forming at least a part of a front and a part of at least one side thereof, said low wall being sufficiently low in height to create an open space to thereby provide access to said workpiece from the front and said at least one side thereof when said workpiece is supported in said vertical location in the working zone of said apparatus;
- an arm supported at one end thereof outside of said work tank and extending through said opening in a sealing relationship therewith, said lower guide being disposed on the other end of said arm, said tank and said arm being movable relative to each other;
- said work tank further comprising at least one movable frame member vertically moveable and stowable with respect to said base container member whereby said at least one moveable frame member is operable to be raised from a stowed position to thereby cover said open space; and
- means for raising and lowering said at least one moveable frame member with respect to said base container member; and
- wherein said at least one moveable member further comprises a rigid inside wall and a rigid outside wall and further comprising a passage within said base container member operable to register and interconnect with a passage disposed between the inner and outer walls of said at least one moveable frame member, whereby when said at least one moveable frame member is in its raised position, said passages are operable to drain any excess fluid in said work tank.

11. The wire-cut electroerosion device according to claim 10, wherein said at least one moveable frame member comprises first and second moveable members, said first moveable member in its raised position being positioned adjacent said base container member and said second moveable member, in its raised position, being positioned adjacent said first moveable member, said first and second moveable members, in their lowered positions, being adapted to telescopically nest with said base container member whereby said open space is unobstructed thereby.

12. A wire-cut electroerosion apparatus having a work stand and an electrode wire tensioned between upper and lower guide members for machining a contour in a workpiece supported on a top surface of said work stand at a vertical location in a working zone thereof, said apparatus further comprising:
- a generally four-sided work tank for containing a dielectric fluid, said work tank including a base container member forming a rear wall at the rear side thereof and having an opening therein, and a low wall forming a front and sides thereof, said low wall being lower in height than the top surface of said work stand to thereby provide access to said workpiece from the front and sides when said workpiece is supported in said vertical location in the working zone of said apparatus;
- an arm supported at one end thereof outside of said work tank and extending through said opening in a sealing relationship therewith, the other end of said arm supporting said lower guide member, said tank and said arm being movable relative to each other;
- said work tank further comprising at least one generally vertically moveable frame member stowable with respect to said base container, whereby, in its stowed position, said at least one moveable frame member is lower in height than the top surface of said work stand;
- a cross table on which said base container is supported for moving said work tank relative to said arm in a plane parallel to the top surface of said work stand, a top surface of said cross table forming a bottom of said work tank; and
- means, supported on and vertically moveable with respect to the bottom of said work tank, for raising and lowering said at least one moveable frame member with respect to said base container member, said means for raising and lowering being lower in height than the top surface of said work stand in the vicinity of said low wall when said at least one moveable frame member is in its stowed position.

13. A wire-cut electroerosion apparatus having an electrode wire for machining a workpiece supported at a vertical location in a working zone thereof, said apparatus comprising:
- a generally four-sided work tank for containing a dielectric fluid, said work tank including a base container member forming a rear wall at the rear side thereof and having a low wall forming a front and sides thereof, said low wall being sufficiently low in height to create an open space to thereby provide access to said workpiece from the front and side when said workpiece is supported in said vertical location in the working zone of said apparatus;

said work tank further comprising at least one moveable frame member vertically moveable with respect to said base container member to thereby cover said open space;

a pair of pantographs, each pantograph having a link pin about which it expands and contracts for raising and lowering said at least one moveable frame member with respect to said base container member;

a frame vertically supported on said tank;

a screw supported on said frame and engaged with said link pin for raising and lowering said link pin to thereby expand and contract said pantograph; and a screw driving device for rotatably driving said screw.

14. The wire-cut electroerosion apparatus according to claim 13, further comprising a housing member connected to said link pin and positioned to spirally engage said screw whereby said housing member is raised and lowered by means of rotation of said screw.

15. The wire-cut electroerosion apparatus according to claim 14, further comprising a plurality of rollers for guiding movement of said housing member within said frame, whereby said screw is supported against a load applied thereto.

* * * * *